(12) United States Patent
Davies (10) Patent No.: US 9,676,938 B2
(45) Date of Patent: Jun. 13, 2017

(54) POLYMER COMPOSITION (75) Inventor: Mark Davies, Redcar (GB)

(73) Assignee: LUCITE INTERNATIONAL UK LIMITED, Southampton, Hampshire (GB)

( * ) Notice: Subject to any disclaimer, the term of this patent is extended or adjusted under 35 U.S.C. 154(b) by 143 days.

(21) Appl. No.: 12/602,611

(22) PCT Filed: Jun. 5, 2008

(86) PCT No.: PCT/GB2008/050415
§ 371 (c)(1),
(2), (4) Date: Mar. 25, 2010

(87) PCT Pub. No.: WO2008/149156
PCT Pub. Date: Dec. 11, 2008

(65) Prior Publication Data
US 2010/0184906 A1    Jul. 22, 2010

(30) Foreign Application Priority Data
Jun. 8, 2007  (GB) .................................. 0711017.4

(51) Int. Cl.
| C08L 69/00 | (2006.01) |
| C08J 5/04 | (2006.01) |
| C08L 33/06 | (2006.01) |
| C08L 33/12 | (2006.01) |
| C08L 51/04 | (2006.01) |
| C08L 55/02 | (2006.01) |

(52) U.S. Cl.
CPC .............. *C08L 69/00* (2013.01); *C08J 5/043* (2013.01); *C08J 2369/00* (2013.01); *C08J 2433/12* (2013.01); *C08J 2455/00* (2013.01); *C08J 2455/02* (2013.01); *C08L 33/06* (2013.01); *C08L 33/12* (2013.01); *C08L 51/04* (2013.01); *C08L 55/02* (2013.01); *C08L 2207/04* (2013.01); *C08L 2207/53* (2013.01)

(58) Field of Classification Search
CPC .......... C08L 69/00; C08L 33/12; C08L 55/02; C08F 2500/02; C08F 220/14
See application file for complete search history.

(56) References Cited

U.S. PATENT DOCUMENTS

| 2,991,273 | A | | 7/1961 | Hechelhammer et al. |
| 2,999,835 | A | | 9/1961 | Goldberg |
| 2,999,846 | A | | 9/1961 | Schnell et al. |
| 3,028,356 | A | | 4/1962 | Shepard |
| 3,148,172 | A | | 9/1964 | Fox |
| 3,271,367 | A | | 9/1966 | Schnell et al. |
| 3,879,347 | A | | 4/1975 | Serini et al. |
| 3,890,266 | A | | 6/1975 | Serini et al. |
| 3,978,158 | A | * | 8/1976 | Yonemitsu et al. ............ 525/67 |
| 4,100,243 | A | * | 7/1978 | Wissinger et al. ....... 264/173.17 |
| 4,260,693 | A | | 4/1981 | Liu |
| 4,444,949 | A | | 4/1984 | Liu |
| 4,579,909 | A | | 4/1986 | Giles, Jr. et al. |
| 4,745,029 | A | * | 5/1988 | Kambour ...................... 428/412 |
| 4,749,749 | A | * | 6/1988 | Munzer .................. C08L 69/00 525/146 |
| 4,906,688 | A | | 3/1990 | Fichenauer et al. |
| 5,112,909 | A | * | 5/1992 | Zimmerman et al. .......... 525/67 |
| 5,128,409 | A | | 7/1992 | Gaggar |
| 5,250,606 | A | * | 10/1993 | Guest et al. ................... 524/504 |
| 5,292,786 | A | | 3/1994 | Gaggar et al. |
| 5,318,737 | A | | 6/1994 | Trabert et al. |
| 5,583,670 | A | * | 12/1996 | Iijima et al. .................... 349/86 |
| 5,962,136 | A | * | 10/1999 | Dewez et al. ................. 428/410 |
| 2003/0149190 | A1 | * | 8/2003 | Duan ................... C08G 63/199 525/439 |
| 2003/0173546 | A1 | * | 9/2003 | Hiroshi et al. ................ 252/500 |
| 2004/0108623 | A1 | | 6/2004 | Deeter et al. |
| 2004/0176505 | A1 | | 9/2004 | Seidel et al. |
| 2005/0036020 | A1 | | 2/2005 | Li et al. |
| 2005/0233124 | A1 | * | 10/2005 | Marot et al. ................... 428/216 |
| 2006/0036035 | A1 | * | 2/2006 | Govaerts et al. .............. 525/101 |
| 2007/0244227 | A1 | * | 10/2007 | Eipper et al. ................. 523/400 |
| 2008/0132614 | A1 | | 6/2008 | Jung et al. |
| 2012/0321861 | A1 | * | 12/2012 | Kamiyoshi et al. ....... 428/195.1 |

FOREIGN PATENT DOCUMENTS

| AU | 200066877 B2 | 5/2002 |
| CN | 1122350 A | 5/1996 |
| CN | 1754912 A | 4/2006 |
| DE | 1 570 703 A1 | 2/1970 |
| DE | 2 063 050 A1 | 7/1972 |
| DE | 2 063 052 A1 | 7/1972 |
| DE | 2 211 957 A1 | 9/1973 |

(Continued)

OTHER PUBLICATIONS

Shoup "Injection Molding Fractional Melt Index, High Density Polyethylene Materials" International Converence on Polyolefins SPE 2005.*
Ukrainian Office Action issued in Application No. a200912715 dated Feb. 6, 2012.
Russian Office Action issued in Application No. 2009148300/05 dated Mar. 23, 2012.
Office Action issued in Chinese Application No. 200880017136.6 dated May 10, 2013.
Office Action issued in Australian Application No. 2008259522 dated Nov. 5, 2012.
Office Action issued in Chinese Application No. 200880017136.6 dated Oct. 29, 2012.
Office Action issued in European Application No. 08 762 525.7 dated Nov. 13, 2012.
Office Action issued in Malaysian Application No. PI 20095186 dated Dec. 31, 2012.
Notice of Reasons for Rejection issued in the Japanese Application No. 2010-510890 dated Jul. 24, 2012.
Office Action issued in European Application No. 08762525.7 dated Oct. 21, 2013.
Office Action issued in Japanese Application No. 2010-510890 dated Nov. 5, 2013.

(Continued)

Primary Examiner — Mark Kaucher
(74) Attorney, Agent, or Firm — Venable LLP; Keith G. Haddaway; Annette K. Kwok (57) ABSTRACT

A composition comprising a mixture of: (i) an aromatic polycarbonate; (ii) a graft copolymer including polyacrylonitrile; and, (iii) a non-crosslinked acrylic polymer having a weight average molecular weight (Mw) of less than or equal to 65,000 Daltons (Da).

42 Claims, 2 Drawing Sheets

(56) References Cited

FOREIGN PATENT DOCUMENTS

| | | |
|---|---|---|
| DE | 2 211 956 A1 | 10/1973 |
| DE | 2 248 817 A1 | 4/1974 |
| DE | 4 014 308 A1 | 11/1991 |
| DE | 19622579 C1 | 9/1997 |
| DE | 103 04 159 A1 | 8/2004 |
| EP | 0 481 161 A2 | 4/1992 |
| EP | 0 694 581 A2 | 1/1996 |
| EP | 1348735 A1 | 10/2003 |
| GB | 1 122 003 A | 7/1968 |
| GB | 1286272 A | 8/1972 |
| GB | 1 341 318 A | 12/1973 |
| GB | 1 367 788 A | 9/1974 |
| GB | 1 367 790 A | 9/1974 |
| JP | 59-155436 A | 9/1984 |
| JP | 61-002749 A | 1/1986 |
| JP | 63-221155 A | 9/1988 |
| JP | H04-226149 A | 8/1992 |
| JP | 8-034895 | 2/1996 |
| JP | 08-085749 A | 4/1996 |
| JP | 08-157706 A | 6/1996 |
| JP | 10-226748 A | 8/1998 |
| JP | H10-338792 A | 12/1998 |
| JP | 2000-095932 A | 4/2000 |
| JP | 2001/172491 A | 6/2001 |
| JP | 2006-509862 A | 3/2006 |
| JP | 2006-199732 A | 8/2006 |
| JP | 2006-257126 A | 9/2006 |
| JP | 2012-251108 A | 12/2012 |
| KR | 2007-0002376 A | 1/2007 |
| WO | WO 2006/114576 | 11/2006 |
| WO | WO 2007/004762 | 1/2007 |

OTHER PUBLICATIONS

Office Action issued in Chinese Patent Application No. 200880017136.3 dated Dec. 24, 2013.
Notice of Acceptance issued in Australian Patent Application No. 2008259522 dated Jan. 2, 2014.
Office Action and Search Report issued in Taiwanese Patent Application No. 097121289 dated Dec. 18, 2013.
Office Action issued in Chinese Application No. 200880017136.6 dated Sep. 4, 2013.
Office Action issued in Malaysian Patent Office Action No. PI 20095186 dated Jun. 13, 2014.
Office Action issued in Korean Patent Application No. 10-2009-7026036 dated Jul. 10, 2014.
Office Action issued in Mexican Patent Application No. MX/a/2009/013314 dated Jun. 23, 2014.
Office Action issued in Canadian Patent Application No. 2,685,812 dated Feb. 14, 2014.
Office Action issued in U.S. Appl. No. 13/356,904 dated Feb. 23, 2015.
Office Action issued in U.S. Appl. No. 13/356,904 dated Sep. 16, 2015.

* cited by examiner

POLYMER COMPOSITION

The present invention relates to, amongst other things, an aromatic polycarbonate composition, a process for manufacturing an aromatic polycarbonate composition, an article and a method of forming an article from an aromatic polycarbonate composition. In particular, although not exclusively, the present invention relates to an aromatic polycarbonate composition which typically exhibits desirable short cycle times in melt processing applications, such as injection moulding applications.

Thermoplastic aromatic polycarbonates may be employed in numerous applications, such as electrical, engineering and automotive applications. Typically, high molecular weight aromatic polycarbonates (e.g. Mw of 20,000 to 50,000 Da) are employed in electrical and engineering applications because of their relatively high strength, high impact resistance, high temperature and fire resistance properties. However, high molecular weight polycarbonates typically exhibit relatively poor melt flow characteristics which may restrict their applications. In particular, high molecular weight aromatic polycarbonates typically exhibit relatively low melt flow rates. Consequently, it is typically more difficult to form intricate moulded parts and moulded articles with low levels of residual stress from such aromatic polycarbonates. A further disadvantage which may restrict the applications of aromatic polycarbonates is the relatively high cost of these polymers.

In an attempt to overcome some of the disadvantages associated with aromatic polycarbonates, blends of the polycarbonate with other polymer resins have been employed. For example, blends of aromatic polycarbonates and acrylonitrile-butadiene-styrene (ABS) have been used to reduce the raw material costs and enhance the melt flow of the polycarbonate. However, despite the enhanced melt flow of the aromatic polycarbonate and ABS blend generally there is an increase in the process cycle time in melt processing applications (e.g. injection moulding applications), as it is necessary to cool the blend for prolonged periods of time to form the moulding and allow the moulding to be removed from the mould without damaging the moulding and/or the mould. The increased process cycle time, namely the time to form an article by an injection moulding process, increases the costs and decreases the efficiency of the injection moulding procedure. Further disadvantages which may result from blends of aromatic polycarbonates and ABS include a reduction in the Vicat softening point and a reduction in the impact resistance compared to the aromatic polycarbonate alone.

The present invention therefore seeks to solve some of the aforementioned technical problems associated with processing a blend of an aromatic polycarbonate and another polymer, particularly a thermoplastic blend of an aromatic polycarbonate and another polymer.

Thus according to a first aspect, the present invention provides a composition comprising a mixture of:
 (i) an aromatic polycarbonate;
 (ii) a graft copolymer including polyacrylonitrile; and,
 (iii) a non-crosslinked acrylic polymer having a weight average molecular weight (Mw) of less than or equal to 65,000 Daltons (Da).

Such a composition may be referred to hereinafter as the composition of the present invention. Preferably, the composition of the present invention is a polymer blend.

It has been found that when some of the graft copolymer including polyacrylonitrile (ii) in a mixture of aromatic polycarbonate (i) and the graft copolymer including polyacrylonitrile (ii) is replaced with the relatively low molecular weight non-crosslinked acrylic polymer (iii), the Vicat softening temperature of the mixture is typically essentially unchanged. Unexpectedly however the process cycle time in injection moulding applications is typically reduced significantly. This is unexpected since conventional theory suggests that a heat resistance increase such as a rise in the Vicat softening temperature, in the absence of changes in thermal diffusivity, is necessary for a reduction in the cooling time of an injection moulded part. Additionally, it has been found that when some of the graft copolymer including polyacrylonitrile (ii) in a mixture of aromatic polycarbonate (i) and the graft copolymer including polyacrylonitrile (ii) is replaced with the relatively low molecular weight non-crosslinked acrylic polymer (iii), the Melt Flow Rate of the mixture typically increases. The enhanced Melt flow Rate of the composition of the present invention permits the formation of more complex shaped articles and articles having lower levels of residual stress than a comparable composition not including the low molecular weight acrylic polymer (iii). Suitably, the composition of the present invention typically offers significant advantages in melt processing applications, such as injection moulding applications.

The Melt Flow Rate measures the rate of extrusion of thermoplastics through an orifice at a prescribed temperature and load. Melt Flow Rate is also referred to as Melt Flow Index. The process cycle time in injection moulding applications is the total time taken to produce a moulded article having no visible defects. The process cycle includes the following: (a) injecting the molten polymer into a mould; (b) a holding and cooling phase—during the holding phase pressure is applied to the molten polymer so it packs the entirety of the mould as the cooling polymer in the mould shrinks. Once the gate freezes (i.e. the polymer at the entry point of the mould cools so that no more material may be packed into the mould cavity) the pressure is removed and the part is allowed to cool in the mould until it is rigid enough to survive the ejection process; (c) retraction of the injector screw; (d) mould opening; (e) part ejection; and (f) mould closing so it may be re-used. Typically, steps (b) and (c) take place simultaneously. Usually, the holding and cooling phase (step b) dominates the process cycle time. Consequently, a reduction of time in this step, for example a reduction in time for the molten polymer to cool and solidify, is likely to reduce the overall process cycle time of the moulding procedure.

The Vicat softening temperature of a polymer or polymer blend is the temperature at which a specimen of the polymer/polymer blend starts to soften rapidly. Typically, it is the temperature at which the specimen is penetrated to a depth of 1 mm with a flat ended needle under the application of a specific load. The Vicat softening temperature reflects the point of softening to be expected when a material is used in an elevated temperature application. The Vicat softening temperature of the composition of the present invention is essentially comparable to the unmodified aromatic polycarbonate and acrylonitrile graft copolymer mixture not including the low molecular weight acrylic polymer. Conveniently, the composition of the present invention may be used in similar high temperature applications as aromatic polycarbonate and ABS blends, such as electrical applications. A suitable method of measuring Vicat softening temperature is ISO 306B:1987 Second Edition.

Suitably, the composition of the present invention is a thermoplastic composition, namely the composition becomes soft and "plastic" upon heating and firm when cool.

Suitably, the composition of the present invention may be formed into shaped articles by melt-processing techniques such as injection moulding, melt extrusion and blow moulding.

Preferably, the non-crosslinked acrylic polymer comprises a polymer obtainable by polymerising 60 to 100% by weight of methyl methacrylate monomer and 0 to 40% by weight of one or more alkyl(alk)acrylate comonomers. Suitably, the non-crosslinked acrylic polymer comprises a methyl methacrylate homopolymer or a copolymer comprising greater than or equal to 60% by weight methyl methacrylate and less than or equal to 40% by weight of one or more alkyl(alk)acrylate comonomers. Most preferably, the non-crosslinked acrylic polymer comprises a copolymer as defined herein.

When the non-crosslinked acrylic polymer comprises a copolymer, the copolymer is essentially a random copolymer. By the term "random copolymer" we mean a copolymer consisting of macromolecules in which the probability of finding a given monomeric unit at any given site in the chain is independent of the nature of the adjacent units. Suitably, the random copolymer is essentially a linear random copolymer.

As used herein, the term "alkyl(alk)acrylate" refers to the corresponding acrylate ester or alkacrylate ester, which are usually formed from the corresponding acrylic or alkacrylic acids, respectively. In other words, the term "alkyl(alk)acrylate" refers to either an alkyl alkacrylate or an alkyl acrylate. It will be appreciated that when the non-crosslinked acrylic polymer comprises a non-crosslinked acrylic copolymer the term alkyl(alk)acrylate does not embrace methyl methacrylate.

Preferably, the one or more alkyl(alk)acrylates is a $(C_1-C_{22})$alkyl$((C_1-C_{10})$alk)acrylate. As mentioned in the preceding paragraph the $(C_1-C_{22})$alkyl $((C_1-C_{10})$alk)acrylate does not include a $C_1$ alkyl($C_1$alk)acrylate, namely methyl methacrylate. Examples of $C_1-C_{22}$ alkyl groups of the alkyl(alk)acrylates include methyl, ethyl, n-propyl, n-butyl, iso-butyl, tert-butyl, iso-propyl, pentyl, hexyl, cyclohexyl, 2-ethyl hexyl, heptyl, octyl, nonyl, decyl, isodecyl, undecyl, dodecyl, tridecyl, tetradecyl, pentadecyl, hexadecyl, heptadecyl, octadecyl, nonadecyl, eicosyl, behenyl, and isomers thereof. The alkyl group may be straight or branched chain. Preferably, the $(C_1-C_{22})$alkyl group represents a $(C_1-C_8)$alkyl group as defined above, more preferably a $(C_1-C_6)$alkyl group as defined above, even more preferably a $(C_1-C_4)$alkyl group as defined above. Examples of $C_{1-10}$ alk groups of the alkyl(alk)acrylate include methyl, ethyl, n-propyl, iso-propyl, n-butyl, iso-butyl, tert-butyl, pentyl, hexyl, cyclohexyl, 2-ethyl hexyl, heptyl, octyl, nonyl, decyl and isomers thereof. The alk groups may be straight or branched chain. Preferably, the $(C_1-C_{10})$alk group represents a $(C_1-C_6)$alk group as defined above, more preferably a $(C_1-C_4)$ alk group as defined above, even more preferably a methyl group.

Preferably, the one or more alkyl(alk)acrylates is a $(C_1-C_8)$alkyl$((C_1-C_4)$alk)acrylate, even more preferably a $(C_1-C_8)$alkyl(meth)acrylate, most preferably a $(C_1-C_4)$alkyl (meth)acrylate. It will be appreciated that the term $(C_1-C_8)$ alkyl(meth)acrylate refers to either $(C_1-C_8)$alkyl acrylate or $(C_1-C_8)$alkyl methacrylate. Examples of $(C_1-C_8)$alkyl(meth) acrylate include the alkyl methacrylates: ethyl methacrylate (EMA), n-propyl methacrylate (PMA), isopropyl methacrylate (IPMA), n-butyl methacrylate (BMA), isobutyl methacrylate (IBMA), tert-butyl methacrylate (TBMA), octyl methacrylate (OMA) and the alkyl acrylates: methyl acrylate (MA), ethyl acrylate (EA), n-propyl acrylate (PA), n-butyl acrylate (BA), isopropyl acrylate (IPA), isobutyl acrylate (IBA), tert-butyl acrylate (TBA), octyl acrylate (OA) and combinations thereof. Preferably, the one or more alkyl(alk) acrylates comprises an alkyl acrylate as defined herein, particularly a single alkyl acrylate.

As stated previously, the non-crosslinked acrylic polymer is preferably a non-crosslinked acrylic copolymer. Suitably, the non-crosslinked acrylic copolymer is obtainable by polymerising greater than or equal to 60% by weight methyl methacrylate monomer and less than or equal to 40% by weight of one or more alkyl(alk)acrylate comonomers as defined herein. More preferably, the non-crosslinked acrylic copolymer is obtainable by polymerising greater than or equal to 60% by weight methyl methacrylate monomer and less than or equal to 40% by weight of one or more alkyl acrylate comonomers as defined herein. Preferred alkyl acrylate comonomers comprise $C_1-C_8$ alkyl acrylate comonomers which include methyl acrylate, ethyl acrylate, n-propyl acrylate, iso-propyl acrylate, n-butyl acrylate, iso-butyl acrylate, tert-butyl acrylate, pentyl acrylate, n-hexyl acrylate, cyclohexyl acrylate, 2-ethylhexyl acrylate, heptyl acrylate and octyl acrylate. Further preferred alkyl acrylate comonomers comprise $C_1-C_4$ alkyl acrylate comonomers and ethyl hexyl acrylate. Most preferred alkyl acrylate comonomers comprise $C_1-C_4$ alkyl acrylate comonomers, such as methyl acrylate, ethyl acrylate, n-propyl acrylate, iso-propyl acrylate n-butyl acrylate, iso-butyl acrylate and tert-butyl acrylate, especially methyl acrylate, ethyl acrylate, n-propyl acrylate and n-butyl acrylate.

Preferably, the non-crosslinked acrylic polymer does not include any acrylic acid or methacrylic acid monomers. Preferably, the non-crosslinked acrylic polymer does not include any functional groups, for example hydroxyl or amine functional groups, which may react with the aromatic polycarbonate (i) and/or the graft copolymer comprising acrylonitrile (ii) in the composition of the present invention. Most preferably, the non-crosslinked acrylic copolymer consists essentially of greater than or equal to 60% by weight methyl methacrylate monomer and less than or equal to 40% by weight of one or more alkyl(alk)acrylate comonomers as defined herein. By the term "consists essentially of" we mean that the non-crosslinked acrylic copolymer is obtainable from essentially only methyl methacrylate monomers and one or more alkyl(alk)acrylate comonomers as defined herein.

Suitably, the non-crosslinked acrylic copolymer comprises greater than or equal to 60% by weight, preferably greater than or equal to 70% by weight, more preferably greater than or equal to 80% by weight, most preferably greater than or equal to 90% by weight methyl methacrylate based on the total weight of the non-crosslinked acrylic copolymer.

Suitably, the non-crosslinked acrylic copolymer comprises less than or equal to 99.9% by weight, preferably less than or equal to 99.5% by weight, more preferably less than or equal to 99% by weight, more preferably less than or equal to 98% by weight, most preferably less than or equal to 97% by weight methyl methacrylate based on the total weight of the non-crosslinked acrylic copolymer.

Suitably, the non-crosslinked acrylic copolymer comprises greater than or equal to 0.1% by weight, preferably greater than or equal to 0.5% by weight, more preferably greater than or equal to 1% by weight, more preferably greater than or equal to 2% by weight, most preferably greater than or equal to 3% by weight of one or more alkyl(alk)acrylate comonomers as defined herein based on the total weight of the non-crosslinked acrylic copolymer.

Suitably, the non-crosslinked acrylic copolymer comprises less than or equal to 40% by weight, preferably less than or equal to 30% by weight, more preferably less than or equal to 20% by weight, most preferably less than or equal to 10% by weight of one or more alkyl(alk)acrylate comonomers as defined herein based on the total weight of the non-crosslinked acrylic copolymer.

Unexpectedly, it has been found that by employing a non-crosslinked acrylic copolymer having a relatively low alkyl(alk)acrylate comonomer content as defined herein, typically provides a composition of the present invention having the desired increased Melt Flow Rate whilst still retaining an acceptable, and relatively high, Vicat softening temperature. Consequently, such compositions may be suitable for high temperature applications, for example, electrical applications.

Suitably, the weight average molecular weight (Mw) of the non-crosslinked acrylic polymer is less than or equal to 65,000 Daltons (Da), preferably less than or equal to 60,000 Da, more preferably less than or equal to 55,000 Da, even more preferably less than or equal to 50,000 Da.

Suitably, the weight average molecular weight (Mw) of the non-crosslinked acrylic polymer is greater than or equal to 25,000 Da, preferably greater than or equal to 30,000 Da, more preferably greater than or equal to 35,000 Da.

The weight average molecular weight (Mw) of the non-crosslinked acrylic copolymer may be determined by techniques well known to those skilled in the art, for example gel permeation chromatography. An example gel permeation chromatography method is described hereunder in the examples. Values of Mw referred to herein may relate to values obtained when either poly methylmethacrylate (PMMA) or polystyrene standards are used to calibrate the gel permeation chromatography equipment. In a preferred embodiment, PMMA standards are used.

It has been found that if the weight average molecular weight (Mw) of the non-crosslinked acrylic polymer is greater than 65,000 Da, especially using the preferred alkyl (alk)acrylate comonomers at the preferred levels, then the composition of the present invention may not exhibit the desirable enhanced Melt Flow Rate and process cycle time reduction features. Such compositions are typically not as well suited for efficiently and economically forming complex shaped articles.

Typically, if the weight average molecular weight (Mw) of the non-crosslinked acrylic polymer is less than 25,000 Da then the composition of the present invention may exhibit an undesirable decrease in impact strength and the composition of the present invention may be too brittle for certain applications. Suitably, if the non-crosslinked acrylic polymer has a weight average molecular weight (Mw) of between greater than or equal to 25,000 Da and less than or equal to 65,000 Da, then this typically provides a composition of the present invention with a desirable balance of rheological, mechanical and physical properties. A highly preferred non-crosslinked acrylic copolymer has a weight average molecular weight (Mw) of approximately 35,000 to 45,000 Da, particularly 40,000 Da.

Preferably, the non-crosslinked acrylic polymer is present in an amount of greater than or equal to 3% by weight, more preferably greater than or equal to 5% by weight, most preferably greater than or equal to 7% by weight based on the total weight of the composition of the present invention.

Preferably, the non-crosslinked acrylic polymer is present in an amount of less than or equal to 25% by weight, more preferably less than or equal to 23% by weight, most preferably less than or equal to 20% by weight based on the total weight of the composition of the present invention.

Unexpectedly, it has been found that if the non-crosslinked acrylic polymer is included in the composition of the present invention within the above defined limits then this may provide a composition which exhibits the desirable enhanced melt flow rate whilst maintaining a satisfactory Vicat softening temperature. If the non-crosslinked acrylic polymer is present in an amount of greater than 25% by weight then this may produce a composition with inferior impact resistance. Suitably, if the non-crosslinked acrylic polymer is present in an amount of less than 3% by weight then this may produce a composition not displaying a satisfactory enhancement in melt flow. Most preferably, the non-crosslinked acrylic polymer is present in an amount of between 7 to 20% by weight, based on the total weight of the composition.

Suitably, the non-crosslinked acrylic polymer may be prepared by techniques well known to those skilled in the art, for example emulsion, bulk, solution and suspension polymerisation using appropriate initiators and chain transfer agents.

Aromatic polycarbonates include homopolycarbonates, copolycarbonates and mixtures thereof. The aromatic polycarbonates typically have a weight average molecular weight (Mw) of greater than or equal to 10,000 Da, more preferably greater than or equal to 20,000 Da. Preferably, the aromatic polycarbonates have a weight average molecular weight (Mw) of less than or equal to 200,000 Da, more preferably less than or equal to 150,000 Da, even more preferably less than or equal to 100,000 Da, most preferably less than or equal to 50,000 Da.

The aromatic polycarbonates may be prepared by techniques well known to those skilled in the art, for example by polycondensation of a dihydroxy aromatic compound with a carbonic acid derivative such as phosgene (see German Offenlegungsschriften U.S. Pat. Nos. 2,063,050; 2,063,052; 1,570,703; 2,211,956; 2,211,957 and 2,248,817).

Among the dihydroxy compounds useful for preparing the aromatic polycarbonates are hydroquinone, resorcinol, bis (hydroxyphenyl)-alkanes, bis (hydroxyphenyl)-ethers, bis (hydroxyphenyl)-ketones, bis-(hydroxyphenyl)-sulfoxides, bis-(hydroxylphenyl)-sulfides, bis-(hydroxyphenyl)-sulfones, and α,α-bis-(hydroxylphenyl)-diisopropylbenzenes, as well as their alkyl substituted derivatives. These and further suitable aromatic dihydroxy compounds are described, for example, in U.S. Pat. Nos. 3,028,356; 2,999, 835; 3,148,172; 2,991,273; 3,271,367; and 2,999,846.

Further examples of suitable bisphenols are 2,2-bis-(4-hydroxyphenyl)-propane (bisphenol A), 2,4-bis-(4-hydroxyphenyl)-2-methylbutane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, dihydroxybenzophenone, 2,4-bis-(3,5-dimethyl-4-hydroxyphenyl)-cyclohexane, α,α'-bis-(3,5-dimethyl-4-hydroxyphenyl)-p-diisopropylbenzene and 4,4'-sulfonyl diphenol.

Examples of particularly preferred aromatic bisphenols are 2,2-bis-(4-hydroxyphenyl)-propane, 2,2,-bis-(3,5-dimethyl-4-hydroxyphenyl)-propane and 1,1-bis-(4-hydroxyphenyl)-cyclohexane.

The most preferred bisphenol is 2,2-bis-(4-hydroxyphenyl)-propane (bisphenol A).

Some of the most preferred aromatic polycarbonates include Lexan™ available from General Electric, now "Sabic", Calibre™ available from The Dow Chemical Company and Makrolon™ available from Bayer.

Suitably, the aromatic polycarbonate is present in an amount of greater than or equal to 30% by weight, preferably greater than or equal to 35% by weight, more preferably greater than or equal to 40% by weight, even more preferably greater than or equal to 45% by weight, even more preferably greater than or equal to 50% by weight, most preferably greater than or equal to 55% by weight based on the total weight of the composition of the present invention.

Suitably, the aromatic polycarbonate is present in an amount of less than or equal to 97% by weight, preferably less than or equal to 95% by weight, more preferably less than or equal to 90% by weight, more preferably less than or equal to 85% by weight, more preferably less than or equal to 80% by weight, even more preferably less than or equal to 75% by weight based on the total weight of the composition of the present invention.

Suitably, if the amount of the aromatic polycarbonate is within the aforementioned ranges then this may provide a composition of the present invention which possesses a desirable Vicat softening temperature and desirable impact resistance. Such compositions may be suitable for use in electrical, automotive and engineering applications.

By the term "graft copolymer including polyacrylonitrile" we mean a graft copolymer comprising a polymer derived by polymerising acrylonitrile type monomers. Polyacrylonitrile is synonomous with poly(1-cyanoethylene).

Suitably, the graft copolymer including polyacrylonitrile comprises an acrylic-styrene-acrylonitrile (ASA) polymer, an acrylonitrile-EPDM-styrene (AES) polymer, an olefin-styrene-acrylonitrile (OSA) polymer or an acrylonitrile-butadiene-styrene (ABS) polymer. More preferably, the graft copolymer including polyacrylonitrile comprises an ASA polymer an AES polymer or an ABS polymer. Most preferably, the graft copolymer including polyacrylonitrile comprises an ABS polymer.

Suitable graft copolymers including polyacrylonitrile include greater than or equal to 10% by weight, preferably greater than or equal to 15% by weight, more preferably greater than or equal to 20% by weight, most preferably greater than or equal to 25% by weight of acrylonitrile (i.e. 1-cyanoethylene) based on the total weight of the copolymer. Suitable graft copolymers including polyacrylonitrile include less than or equal to 50% by weight, preferably less than or equal to 45% by weight, more preferably less than or equal to 40% by weight, most preferably less than or equal to 35% by weight of acrylonitrile (i.e. 1-cyanoethylene) based on the total weight of the copolymer. A highly preferred graft copolymer including polyacrylonitrile includes about 30% by weight of acrylonitrile (i.e. 1-cyanoethylene).

Suitable graft copolymers including polyacrylonitrile include greater than or equal to 40% by weight, preferably greater than or equal to 45% by weight, more preferably greater than or equal to 50% by weight, even more preferably greater than or equal to 55% by weight, most preferably greater than or equal to 60% by weight styrene, or a derivative thereof such as α-methyl styrene, based on the total weight of the copolymer. Suitable graft copolymers including polyacrylonitrile include less than or equal to 80% by weight, preferably less than or equal to 70% by weight, more preferably less than or equal to 65% by weight styrene, or a derivative thereof such as α-methyl styrene, based on the total weight of the copolymer. Preferably, the graft copolymer including polyacrylonitrile includes styrene.

It will be appreciated by those skilled in the art that the graft copolymer including polyacrylonitrile comprises a grafted phase and a graft base. Suitably, such polymers have rubber elastic properties. Suitable graft copolymers including polyacrylonitrile comprise: (i) 5 to 95% by weight, preferably 20 to 80% by weight, relative to the weight of the graft copolymer of a grafted phase; and (ii) 5 to 95% by weight, preferably 20 to 80% by weight, relative to the weight of the graft copolymer of a graft base. The grafted phase may comprise a polymerised mixture of (a) 50 to 99% by weight, relative to the weight of the mixture, of styrene, α-methyl styrene, ring substituted styrene, $C_1$-$C_8$ alkyl (meth)acrylate or mixtures thereof; and (b) 1 to 50% by weight, relative to the weight of the mixture of acrylonitrile, methacrylonitrile, maleic anhydride, N-substituted maleimide or mixtures thereof. Suitably, the graft base includes one crosslinked elastomer selected from the group consisting of diene and alkyl acrylate in particular.

Particularly preferred graft copolymers including polyacrylonitrile are obtainable by grafting at least one (meth)acrylate and/or acrylonitrile and/or styrene as the grafted base, preferably styrene and acrylonitrile, onto a graft base containing a butadiene polymer. In addition to butadiene units, the graft base may contain up to 50% by weight, based on the weight of the butadiene units, of other ethylenically unsaturated monomers, such as styrene, acrylonitrile, or $C_1$ to $C_4$ alkyl(meth)acrylates. The preferred graft base contains polybutadiene, a copolymer of butadiene and acrylonitrile, or a copolymer of butadiene and styrene.

Suitable graft copolymers including polyacrylonitrile may be produced by free radical graft copolymerisation of the monomers and comonomers constituting the graft phase in the presence of the graft base. Suitable processes include emulsion, solution, bulk or suspension polymerisation.

Suitably, the graft copolymer including polyacrylonitrile is present in an amount of greater than or equal to 0.5% by weight, preferably greater than or equal to 1% by weight, more preferably greater than or equal to 2% by weight, even more preferably greater than or equal to 5% by weight, even more preferably greater than or equal to 10% by weight based on the total weight of the composition of the present invention.

Suitably, the graft copolymer including polyacrylonitrile is present in an amount of less than or equal to 60% by weight, preferably less than or equal to 55% by weight, more preferably less than or equal to 50% by weight, even more preferably less than or equal to 45% by weight, most preferably less than or equal to 40% by weight based on the total weight of the composition of the present invention.

Preferably, the ratio by weight of the aromatic polycarbonate to the weight of the graft copolymer including polyacrylonitrile in the composition of the present invention is 90:1 to 0.5:1, preferably 40:1 to 0.75:1, more preferably 10:1 to 1:1.

According to a preferred aspect, the composition of the present invention further includes an impact modifier for enhancing the toughness of the composition. Suitable impact modifiers include rubbery copolymers such as styrene-butadiene copolymers (SBC), functional ethylene polymers, ethylene-propylene-diene copolymers (EPDM), ethylene-vinyl-acetate copolymers (EVA), butadiene based polymers, styrene-olefin copolymers, methacrylate-butadiene-styrene (MBS) copolymers, and acrylic based impact modifiers. It will be appreciated that the impact modifier, when present in the composition of the present invention, is physically and chemically distinct from the graft copolymer including polyacrylonitrile, the non-crosslinked acrylic polymer and the aromatic polycarbonate. By the term "rubbery copolymer" we mean materials which have a glass transition temperature of less than room temperature, preferably less than or equal to 0° C., more preferably less than or equal to −10° C., even more preferably less than or equal to −20° C., even more preferably less than or equal to −30° C., even more preferably less than or equal to −40° C. In some embodiments, the materials may have a glass transition temperature of less than or equal to −50° C., preferably less than or equal to about −80° C.

As will be discussed hereunder, certain components may exhibit both a glassy phase and a rubbery phase as a result of the component exhibiting more than one glass transition temperature. The glassy phase Tg is observed at a higher temperature than the rubbery phase Tg. For the avoidance of doubt, in instances where the component exhibits both glassy and rubbery phases, the preferred glass transition temperatures mentioned above relate to the rubbery phase of the material, not the glassy phase.

Suitably, the impact modifier is in the form of particles and/or a powder. Preferably, the weight mean particle size of the impact modifier is greater than or equal to 50 nm, more preferably greater than or equal to 100 nm, even more preferably greater than or equal to 150 nm. Preferably the weight mean particle size of the impact modifier is less than or equal to 1000 nm, more preferably less than or equal to 750 nm, even more preferably less than or equal to 500 nm. Most preferably, the weight mean particle size of the impact modifier is 150 nm to 400 nm, especially 200 to 350 nm. By the term "weight mean" as referred to herein we mean the volume/mass weighted arithmetic mean diameter D(4,3). The weight mean particle size may be determined by Photon Correlation Spectroscopy in accordance with ISO 13321:1996(E) using a monochromatic coherent He—Ne laser with a fixed wavelength of 632.8 nm and distilled and filtered water as the dispersion medium.

Highly preferred impact modifiers comprise core-shell impact modifiers, such as MBS impact modifiers and acrylic based impact modifiers (AIM). MBS impact modifiers typically comprise an elastomeric core of styrene and butadiene and a rigid shell comprising a methyl methacrylate homopolymer or a methyl methacrylate—styrene copolymer. Acrylic based impact modifiers typically comprise a core comprising a resin derived from one or more alkyl (alk) acrylate monomers as defined herein and a rigid shell also typically comprising a resin derived from one or more alkyl(alk)acrylate monomers. Acrylic based impact modifiers may also include an intermediate phase which include a resin derived by polymerising styrene type monomers, such as styrene. The inclusion of a MBS impact modifier typically provides enhanced impact properties at lower temperatures (e.g. −20° C.) compared with an acrylic based impact modifier.

Preferred acrylic based core-shell impact modifiers, comprise a core and a rigid outer shell which include resins derived from one or more $C_1$ to $C_5$ alkyl (meth)acrylates as defined herein. Suitable core-shell acrylic based impact modifiers comprise 25 to 95 weight percent of the core and 75 to 5 weight percent of the rigid shell. One or more intermediate phases are optional, for example a middle stage comprising a resin derived from styrene. Suitably if the acrylic based impact modifier comprises two stages then the core comprises an elastomeric phase. If the acrylic based impact modifier comprises one or more intermediate phases then the core may comprise a non-elastomeric phase and the middle stage may comprise the elastomeric phase. Preferred particles include those where the core layer and the outer rigid shell comprise resins which comprise homopolymers of methyl methacrylate or random copolymers of methyl methacrylate (about 88 to 99.9 wt %) and one or more $C_1$ to $C_4$ alkyl acrylate as defined herein (about 0.1 to 12 wt %). The core layer or intermediate layer (where present) further includes a crosslinking monomer (e.g. butylene diacrylate) and/or a graft linking monomer. The graft linking monomer is a polyethylenically unsaturated monomer having a plurality of addition polymerisable reactive groups (e.g. allyl acrylate, diallyl maleate). The function of the graft linking monomer is to provide a residual level of unsaturation in the elastomeric phase. Suitable core-shell acrylic based impact modifiers may be prepared by techniques well known to those skilled in the art as described in U.S. Pat. Nos. 5,318,737; 4,444,949; and, 4,260,693. A highly preferred core-shell acrylic based impact modifier comprises an elastomeric core and a rigid outer shell (i.e. 2 phases) as disclosed in U.S. Pat. No. 4,444,949.

Suitably, the impact modifier may be present in an amount of greater than or equal to 1% by weight, preferably greater than or equal to 2% by weight, more preferably greater than or equal to 3% by weight based on the total weight of the composition of the present invention.

Suitably, the impact modifier may be present in an amount of less than or equal to 20% by weight, preferably less than or equal to 15% by weight, more preferably less than or equal to 10% by weight based on the total weight of the composition of the present invention.

Typically, the inclusion of an impact modifier in a melt processable composition may be expected to result in a composition which is more difficult to melt process. Unexpectedly, the inclusion of the non-crosslinked acrylic polymer (iii) in the composition of the present invention typically reduces the combined holding and cooling time in injection moulding applications even when the composition of the present invention includes an impact modifier. Furthermore, the composition of the present invention typically exhibits an enhanced Melt Flow Rate when it includes an impact modifier compared to a comparable composition comprising only the aromatic polycarbonate and the graft copolymer including acrylonitrile and/or a comparable composition which does not include the non-crosslinked acrylic polymer (iii). The resulting composition of the present invention including an impact modifier typically exhibits enhanced toughness compared with a comparable composition not including an impact modifier. Thus, the non-crosslinked acrylic polymer (iii) in the composition of the present invention typically provides significant advantages in melt processing applications even when the composition includes an impact modifier. In particular, it is possible to vary the concentration of the non-crosslinked acrylic polymer and the impact modifier to enhance the Melt Flow Rate and/or enhance the impact resistance of the composition of the present invention.

Suitably the Melt Flow Index (MFI) @ 260° C. of the composition of the present invention (established in accordance with ISO 1133:1997 using 5 kg/cm³ load as discussed hereunder) is at least 5% greater than, preferably at least 10% greater than, more preferably at least 15% greater than, even more preferably at least 20% greater than, even more preferably at least 30% greater than, even more preferably at least 40% greater than, most preferably at least 50% greater than the MFI value of a comparable composition containing the same level of the aromatic polycarbonate (i) not including the non-crosslinked acrylic polymer (iii) and where the non-crosslinked acrylic polymer (iii) is replaced with the same amount of the graft copolymer including polyacrylonitrile (ii).

The Melt Flow Index of a polymeric material as defined herein is measured at 260° C. in accordance with ISO 1133:1997. The polymeric material for testing is manufactured using a twin screw extruder and preconditioned in a vacuum oven at 80° C. for 24 hours prior to testing. The material is loaded into the barrel of a rheometer heated at 260° C. and having a die of diameter 2.095 ml. The loaded rheometer is allowed to equilibrate for 10 mins and then a load of 5 kg/cm$^3$ applied to the piston. The units for MFI are quoted in g/10 min.

The composition of the present invention may further include one or more reinforcement fibres. Preferred reinforcement fibres include glass fibre and carbon fibre. Unexpectedly, the composition of the present invention including a reinforcement fibre typically displays an enhanced Melt Flow Rate and a reduced combined holding and cooling time in injection moulding applications compared with a comparable composition not including the low molecular weight acrylic polymer. Moreover, the inclusion of the reinforcement fibre in the composition of the present invention typically enhances the stiffness of the polymeric composition. The reinforcement fibre may be present in an amount of less than or equal to 40% by weight, more preferably less than or equal to 30% by weight, even more preferably less than or equal to 20% by weight based on the total weight of the composition of the present invention.

Other optional additives which may be present in the composition of the present invention include: colour concentrates such as dyes and pigments; lubricants; UV stabilisers; thermal stabilisers; antioxidants; flame retardants; antistatic agents; particulate fillers such as talc, glass beads, titanium dioxide and calcium carbonate; nanofillers such as nanoclays, nano oxide particles and carbon nanotubes; and, processing aids such as PTFE. The total amount of such optional additives will generally not exceed 15% by weight based on the total weight of the composition of the present invention.

According to a second aspect of the present invention there is provided a process for manufacturing the composition of the present invention which comprises mixing the aromatic polycarbonate (i) with the graft copolymer including polyacrylonitrile (ii) and the non-crosslinked acrylic polymer (iii), optionally in the presence of an impact modifier and/or a reinforcement fibre.

Preferably, the mixing is performed by melt-blending the aromatic polycarbonate, the graft copolymer including polyacrylonitrile and the non-crosslinked acrylic polymer, optionally with an impact modifier and/or a reinforcement fibre. Preferably, the melt blending is performed at a temperature of between 200° C. to 300° C., more preferably 200° C. to 260° C.

The composition of the present invention may be in the form of sheets, films, powders or granules/pellets. Typically, the composition of the present invention may be supplied in the form of pellets. The pellets may then be thermally processed for any downstream application. Suitable downstream applications include melt-processing applications, such as injection moulding and blow moulding applications.

Thus according to a third aspect, the present invention provides a method of manufacturing an article comprising melting the composition of the present invention, adding the molten composition to a mould, allowing the molten composition to solidify in the mould to form the article and removing the article from the mould. Preferably, the method comprises an injection moulding application wherein the molten composition is injected into the mould. Preferably, the article comprises a shaped article.

Alternatively, or additionally, if the composition of the present invention is in the form of sheets (e.g. extruded or laminated sheets) it may be thermoformed or otherwise formed into a desired shape by any suitable means.

Thus according to a fourth aspect, the present invention provides an article, particularly a shaped article, comprising the composition of the present invention.

Suitably, the article comprising the composition of the present invention comprises a component for use in the automotive, electrical or engineering fields. The component may be formed by injection moulding or fabricated from a sheet for example by thermoforming. The component may subsequently be decorated for example by painting or by applying a decorative film.

Said component may be for use in constructing a vehicle or in another automotive application, both as a bulk material or as a coextruded laminate. Such applications include, but are not limited to, decorative exterior trim, interior trim, vehicle cab mouldings, bumpers (fenders), louvers, rear panels, side and quarter panels and the like.

Said component may be used in electrical applications for example housings for articles such as mobile phones, personal computers and televisions.

Said component may be used in engineering applications for example housings for transformers and switch gear.

The present invention further extends to the use of a non-crosslinked acrylic polymer as defined herein as an additive for decreasing the process cycle time in injection moulding applications of a mixture comprising an aromatic polycarbonate as defined herein and a graft copolymer including polyacrylonitrile as defined herein, optionally including an impact modifier as defined herein and/or a reinforcement fibre.

The present invention further extends to the use of a non-crosslinked acrylic polymer as defined herein as an additive for enhancing the Melt Flow Rate of a mixture comprising an aromatic polycarbonate as defined herein and a graft copolymer including polyacrylonitrile as defined herein, optionally including an impact modifier and/or a reinforcement fibre.

The invention further extends to a method of enhancing the melt flow rate of a mixture comprising an aromatic polycarbonate as defined herein, a graft copolymer including polyacrylonitrile as defined herein and optionally including an impact modifier and/or a reinforcement fibre, the method comprising mixing, preferably melt blending, a non-crosslinked acrylic polymer as defined herein with the mixture.

The invention further extends to a method for decreasing the process cycle time for forming an article in injection moulding applications from a mixture comprising an aromatic polycarbonate as defined herein, a graft copolymer including polyacrylonitrile as defined herein and optionally including an impact modifier and/or a reinforcement fibre, the method comprising mixing a non-crosslinked acrylic polymer with the mixture and then forming an article from the resulting mixture by an injection moulding procedure.

The invention further extends to a non-crosslinked acrylic polymer having a weight average molecular weight (Mw) of less than or equal to 65,000 Daltons as defined herein.

The invention will be further described with reference to the following examples.

In the following Examples, the Melt Flow Index of a polymeric material is measured in accordance with ISO 1133:1997 @ 260° C. using a 5 kg/cm³ load on the piston of the rheometer. Samples are prepared by twin screw extrusion and preconditioned in a vacuum oven at 80° C. for 24 hours. The material is loaded into the barrel of a rheometer heated to 260° C. and fitted with a die of diameter 2.095 ml. The loaded rheometer is allowed to equilibrate for 10 minutes prior to testing.

The impact resistance (Notched Izod) of a polymeric material is measured in accordance with ISO-180A. Test specimens are multipurpose Type 1A having the end tabs cut off. The resulting test specimen measures 80×10×4 mm. The depth under the notch of the specimen is 8 mm. For reduced temperature testing, the test specimen is preconditioned for 6 hours in a freezer set at the desired test temperature. Typically, the elapsed time from removing the specimen from the freezer to impact is 5 seconds.

The Vicat B softening temperature of a polymeric material is determined in accordance with ISO 306B:1987 Second Edition.

The Mw of a polymeric material is determined by using gel permeation chromatography as follows. A dilute solution of polymer (30 mg of polymer dissolved in 10 ml of chloroform) is passed through a column (2×Polymer Laboratories Ltd. UK 2×PLgel 10 μm MIXED-B/300×7.5 mm/Part No. 1110-6100) in an oven held at 30° C. (Polymer Laboratories Ltd UK 505 LC Column Oven) with chloroform as a solvent at a flow rate of 1 ml/min using a HPLC pump (Polymer Laboratories UK Ltd LC1120 HPLC Pump).

The exit of the column is fitted with an infra red detector (Foxboro Miran-1A CVF General Purpose IR Detector) that is tuned to the carbonyl absorption (5.90 micrometers) and this is used for routine determination of molecular weights of acrylic polymers that are soluble in chloroform Calibration is carried out using PMMA standards ex. Polymer Laboratories Ltd. UK covering a molecular weight range of ~5000-1500000.

Example 1—Preparation of a Non-Crosslinked Acrylic Polymer Comprising Methyl Methacrylate and Ethyl Acrylate (97:3)

A 150 liter stainless steel autoclave equipped with a stirrer and a heating and cooling jacket is charged with 54 liters of deionised water, 30 kg of methyl methacrylate (97% by weight), 928 g of ethyl acrylate (3% by weight), 1259 g polymethacrylic acid (PMA-4.07% by weight based on the total amount of monomers), 260 g disodium hydrogen phosphate dehydrate (0.84% by weight based on the total amount of monomers), 62 g of 2,2'-azobis(isobutyronitrile)-(AIBN) (0.2% by weight based on the total amount of monomers) and 343 g of dodecyl mercaptan (1.11% by weight based on the total amount of monomers) with agitation at room temperature. The autoclave is sealed and purged with nitrogen. The sealed autoclave is pressurised to 6 psi and then heated to 82° C. The reaction mixture is stirred while the reaction proceeds and maintained at 82° C. until the reaction exotherm begins to subside, after which the reaction mixture is heated at 95° C. for 20 minutes to reduce residual monomer levels and decompose any residual initiator. The reaction mixture is then cooled to room temperature, the contents removed from the autoclave and filtered.

The filtered polymer is then washed with deionised water, spread onto trays and dried in an air oven at a temperature of 80° C. for 48 hours, to yield an acrylic copolymer comprising 97% by weight methyl methacrylate and 3% by weight ethyl acrylate having a weight average molecular weight (Mw) of 45,000 Da as determined by gel permeation chromatography.

Example 2—Preparation of Non-Crosslinked Acrylic Polymer Comprising Methyl Methacrylate and Ethyl Acrylate (97:3)

Example 1 was repeated except 247.5 g of dodecyl mercaptan (0.8% by weight based on the total amount of monomers) were employed. This produced an acrylic copolymer comprising 97% by weight methyl methacrylate and 3% by weight ethyl acrylate having a weight average molecular weight (Mw) of 50,000 Da as determined by gel permeation chromatography.

Example 3—Preparation of Non-Crosslinked Acrylic Polymer Comprising Methyl Methacrylate and Ethyl Acrylate (97:3)

Example 1 was repeated except 618.5 g of dodecyl mercaptan (2.0% by weight based on the total amount of monomers) were employed. This produced an acrylic copolymer comprising 97% by weight methyl methacrylate and 3% by weight ethyl acrylate having a weight average molecular weight (Mw) of 30,000 Da as determined by gel permeation chromatography.

Example 4—Preparation of Non-Crosslinked Acrylic Polymer Comprising Methyl Methacrylate and Ethyl Acrylate (93.5:6.5)

Example 1 was repeated except 28.918 kg of methyl methacrylate (93.5% by weight) and 2010 g of ethyl acrylate (6.5% by weight) were employed. This produced an acrylic copolymer comprising 93.5% by weight methyl methacrylate and 6.5% by weight ethyl acrylate having a weight average molecular weight of approximately 45,000 Da.

Example 5—Preparation of a Non-Crosslinked Acrylic Polymer Comprising Methyl Methacrylate and Butyl Acrylate (97:3)

Example 1 was repeated except 928 g of n-butyl acrylate (3% by weight) was employed instead of ethyl acrylate.

Example 6—Preparation of a Non-Crosslinked Acrylic Polymer Comprising Methyl Methacrylate and Butyl Acrylate (93.5:6.5)

Example 4 was repeated except 2010 g n-butyl acrylate (6.5% by weight) was employed instead of ethyl acrylate.

Example 7—Preparation of a Composition Comprising an Aromatic Polycarbonate, ABS and an Acrylic Polymer A mixture of Lexan 103 an aromatic polycarbonate available from General Electric, now "Sabic", (7.2 kg) pre-dried in an air circulating oven at 120° C. for 4 hours, Polylac PA 709 a high impact ABS (1.3 kg) available from Chi-Mei and the acrylic polymer of Example 1 (1.5 kg) pre-dried in an air circulating oven at 80° C. for 4 hours was added to a high density polyethylene bag and the contents tumbled by hand for 1 minute. The mixture was then starve fed into the feed hopper of a Werner Pfleider ZSK30 twin screw extruder equipped with two 30 mm co-rotating screws. The six temperature controllable zones of the extruder from the hopper to the die were set at 240° C., 255° C., 255° C., 255° C., 255° C. and 255° C., respectively. A vacuum (20 in Hg) was applied to the vent part between zones 5 and 6 of the extruder (zone 6 being nearest the die). Both of the co-rotating screws were run at 276 rpm and the throughput of the mixture was 11.8 kg/hour. The circular cross-section extrudate is delivered into a 5 meter long water both containing water at room temperature. The cooled extrudate is then passed over a series of guides to a strand pelletizing unit to produce the composition in the form of pellets having a length of 6 mm.

Example 8—Preparation of a Composition Comprising an Aromatic Polycarbonate, ABS and an Acrylic Polymer The procedure of Example 7 was repeated using Lexan 103 (5.5 kg), Polylac PA 709 (3.0 kg) and the acrylic copolymer of Example 4 (1.5 kg) to produce the composition in the form of pellets having a length of 6 mm.

Example 9—Preparation of a Composition Comprising an Aromatic Polycarbonate, ABS and an Acrylic Polymer The procedure of Example 7 was repeated using Lexan 103 (7.0 kg), Polylac PA 709 (2.5 kg) and the acrylic polymer of Example 3 (0.5 kg) to produce the composition in the form of pellets having a length of 6 mm.

General Procedure for Preparing a Composition comprising an Aromatic Polycarbonate, a Graft Copolymer including Polyacrylonitrile, an Acrylic Polymer and an Impact Modifier A mixture of an aromatic polycarbonate pre-dried in an air circulating oven at 120° C. for 4 hours, and a graft copolymer including polyacrylonitrile, the non-crosslinked acrylic polymer having a weight average molecular weight of less than or equal to 65,000 Da and an impact modifier all of which pre-dried in an air circulating oven at 80° C. for 4 hours are added to a high density polyethylene bag and the contents tumbled by hand for 1 minute. The mixture is then starve fed into the feed hopper of a Werner Pfleider ZSK30 twin screw extruder equipped with two 30 mm co-rotating screws. The six temperature controllable zones of the extruder from the hopper to the die were set at 240° C., 255° C., 255° C., 255° C., 255° C. and 255° C., respectively. A vacuum (20 in Hg) was applied to the vent part between zones 5 and 6 of the extruder (zone 6 being nearest the die). Both of the co-rotating screws were run at 276 rpm and the throughput of the mixture was 11.8 kg/hour. The circular cross-section extrudate is delivered into a 5 meter long water both containing water at room temperature. The cooled extrudate is then passed over a series of guides to a strand pelletizing unit to produce the composition in the form of pellets having a length of 6 mm.

Examples 10 to 16

The compositions of Examples 10 to 16 as detailed in Table 1 are prepared in accordance with the general procedure as detailed above. Lexan 103 is an aromatic polycarbonate available from General Electric, now "Sabic", Polylac PA 709 is a high impact ABS available from Chi Mei, KM355 is a MBS based core-shell impact modifier particle (Tg approximately −45° C. having a weight mean particle size of 200 nm) and is available from Röhm & Haas, Clearstrength E920 is a MBS based core-shell impact modifier particle (Tg approximately −80° C. having a weight mean particle size of 300 nm) and is available from Arkema.

Comparative Examples A to F

The comparative compositions of Examples A to F to as detailed in Table 2 are prepared in accordance with the general procedure as detailed above but with the omission of the non-crosslinked acrylic polymer or both the non-crosslinked acrylic polymer and the impact modifier.

The following is evident from the results displayed in Tables 1 and 2:

(a) Increasing the amount of polycarbonate in a polycarbonate and ABS blend reduces the Melt Flow Rate of the blend (see MFI), increases the impact resistance of the blend (see Notched Izod) and increases the Vicat softening temperature of the blend (see Examples A to D of Table 2).

(b) Increasing the amount of impact modifier in a polycarbonate/ABS/impact modifier blend reduces the Melt Flow Rate of the blend and increases the impact resistance (see Examples B, E and F of Table 2).

(c) A decrease in the Melt Flow Rate (MFI) of a polycarbonate and ABS blend optionally including an impact modifier typically results in an increase in the impact resistance (Notched Izod @ 23° C.) of the blend (see Examples A to D of Table 2).

(d) Adding the non-crosslinked acrylic polymer at the expense of ABS to a polycarbonate/ABS/impact modifier blend significantly increases the Melt Flow Rate of the blend. Compare Example F of Table 2 (MFI 8.6 g/10 min @ 260° C.) with Example 10 of Table 1 (MFI 14.5 g/10 min @ 260° C.) and Example E of Table 2 (MFI 10.7 g/10 min @ 260° C.) with Example 11 of Table 1 (MFI 25.6 g/10 min @ 260° C.).

(e) The compositions of the present invention have comparable Vicat softening temperatures to polycarbonate and ABS blends which optionally include an impact modifier (compare Vicat B of Examples 10 to 16 of Table 1 with Examples A to F of Table 2).

(f) Increasing the amount of non-crosslinked acrylic polymer and decreasing the amount of impact modifier in a composition of the present may provide an increase in the Melt Flow Rate without the loss of impact resistance of the composition (compare MFI @ 260° C. g/10 min and Notched Izod @ 23° C. kJ/m$^2$ for Examples 13 and 14 and Examples 15 and 16).

TABLE 1

| Example | Lexan 103 (PC) | Polylac PA 709 (ABS) | Acrylic Polymer | KM355 | E920 | Flexural Modulus GPa | MFI@260° C. g/10 min | Notched Izod 23° C. kJ/m$^2$ | Notched Izod −20° C. kJ/m$^2$ | Vicat B ° C. |
|---|---|---|---|---|---|---|---|---|---|---|
| 10 | 65 | 15 | (Example 4) 10 | 10 | — | 2.3 | 14.5 | 90 | — | 129 |
| 11 | 65 | 15 | (Example 4) 15 | 5 | — | 2.3 | 25.6 | 45 | — | 127 |
| 12 | 65 | 17.5 | (Example 1) 10 | 7.5 | — | 2.09 | 11.4 | 82 | 20 | 129 |
| 13 | 65 | 17.5 | (Example 1) 10 | — | 7.5 | 2.07 | 15 | 50 | 39 | 129 |
| 14 | 65 | 17.5 | (Example 1) 12.5 | — | 5 | 2.15 | 17 | 55 | 41 | 129 |
| 15 | 80 | 2.5 | (Example 1) 10 | — | 7.5 | 2.1 | 12.7 | 54 | 44 | 138 |
| 16 | 80 | 2.5 | (Example 1) 12.5 | — | 5 | 2.18 | 14.6 | 64 | 20 | 138 |

TABLE 2

Comparative Examples

| Example | Lexan 103 (PC) | Polylac PA 709 (ABS) | KM355 | Flexural Modulus GPa | MFI@260° C. g/10 min | Notched Izod 23° C. kJ/m$^2$ | Notched Izod −20° C. kJ/m$^2$ | Vicat B ° C. |
|---|---|---|---|---|---|---|---|---|
| A | 50 | 50 | — | 2.1 | 12.5 | 41 | 39 | 116 |
| B | 65 | 35 | — | 2.19 | 12.4 | 46 | 39 | 127 |
| C | 72.5 | 27.5 | — | 2.2 | 11.8 | 51 | 34 | 133 |
| D | 80 | 20 | — | 2.24 | 11.3 | 60 | 52 | 138 |
| E | 65 | 30 | 5 | 2.2 | 10.7 | 81 | — | 128 |
| F | 65 | 25 | 10 | 2.1 | 8.6 | 93 | — | 128 |

Figure 1:
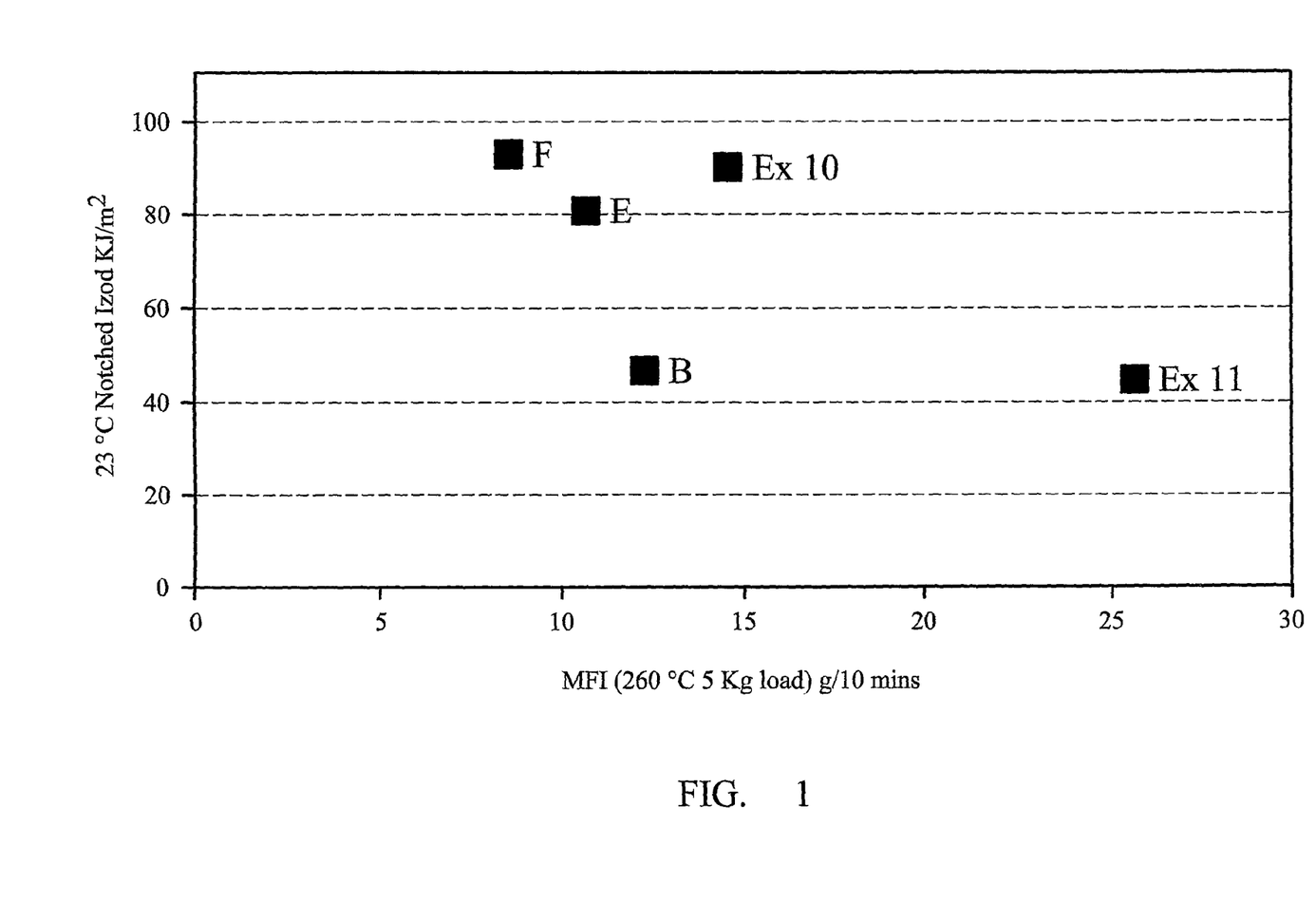
FIG. 1 is a plot of the impact resistance of a composition versus the melt flow rate of a composition.

(g) The combination of a non-crosslinked acrylic polymer and an impact modifier in a polycarbonate/ABS blend typically allows an improvement of impact resistance and/or the Melt Flow Rate of the blend. In this respect, Example 11 of Table 1 has a Notched Izod @ 23° C. of 45 kJ/m$^2$ which is comparable to a polycarbonate/ABS (65:35) blend - see Example B, yet the melt flow rate of Example 11 is 25.6 g/10 min @ 260° C. whereas that of Example B is 12.4 g/10 mins. Similarly, Example 10 of Table 1 has a Melt Flow Rate of 14.5 g/min @ 260° C. which is comparable to, albeit higher than, that of Example B (12.4 g/min @ 260° C.) yet Example 10 has a significantly higher impact resistance (Notched Izod 23° C. of 90 kJ/m$^2$) than that of Example B (Notched Izod @ 23° C. of 46 kJ/m$^2$). The improvement of impact resistance and/or Melt Flow Rate of a polycarbonate/ABS blend using the combination of a non-crosslinked acrylic polymer and an impact modifier is displayed graphically in FIG. 1.

General Injection Moulding Procedure

The polymeric material is dried in an air circulating oven at 80° C. for 3 hours prior to moulding. The injection moulding apparatus consists of a Demag D40 machine equipped with a 28 mm diameter rotating screw which carries the molten polymeric material to a twin parallel bar mould. Each bar mould has the dimensions of 120×10×4 mm and includes a 2 mm diameter circular gate (the entry point for the mould). The machine barrel is heated at 240° C., 250° C., 250° C. and 260° C. in the direction of the nozzle, which is heated at 260° C. The surface of the mould is heated at 80° C. The molten polymeric material is injected into the mould and pressure is applied to the mould so the molten polymeric material packs the entirety of the mould (holding phase). Once the gate freezes, the pressure is removed and the moulding allowed to cool in the mould until it is rigid enough to survive the ejection process (cooling phase). The moulding is then removed from the mould.

For each polymeric composition, the gate freeze time and the minimum cooling phase time was determined. The gate freeze time was determined as follows. The hold on pressure for an unmodified PC/ABS blend was adjusted to the minimum pressure that caused no sink marks to be observed on the mould surfaces. Starting at a low value of hold on time (i.e. application of hold on minimum pressure for a short period of time) the mouldings produced were weighed. The hold on time was then increased upwards by 1 second intervals until a plot of moulding weight versus hold on pressure plateaued. The time corresponding to the start of the plateau represents the gate freeze time. The minimum cooling phase time was determined by applying the hold on pressure for 1 second more than the gate freeze time and then starting at an overly long cooling period, the cooling period was reduced gradually for successive mouldings until the automatic ejector system was unable to fully eject the moulded article. The minimum total cooling time was then calculated as the gate freeze time plus the minimum cooling phase time.

The following compositions as detailed in Table 3 were subjected to an injection moulding procedure as detailed above and the gate freeze time and minimum total cooling time measured.

TABLE 3

| Example | MFI @ 260° C. g/10 min | Gate Freeze Time (s) | Minimum Total Cooling Time (s) |
|---|---|---|---|
| Comparative A | 12.5 | 20 | 51 |
| Comparative B | 12.4 | 19 | 40 |
| Comparative C | 11.8 | 20 | 38 |
| Comparative D | 11.3 | 18 | 30 |
| 12 | 11.4 | 23 | 30 |
| 13 | 15 | 20 | 39 |
| 14 | 17 | 20 | 30 |
| 15 | 12.7 | 19 | 22 |
| 16 | 14.6 | 17 | 26 |

Figure 2:
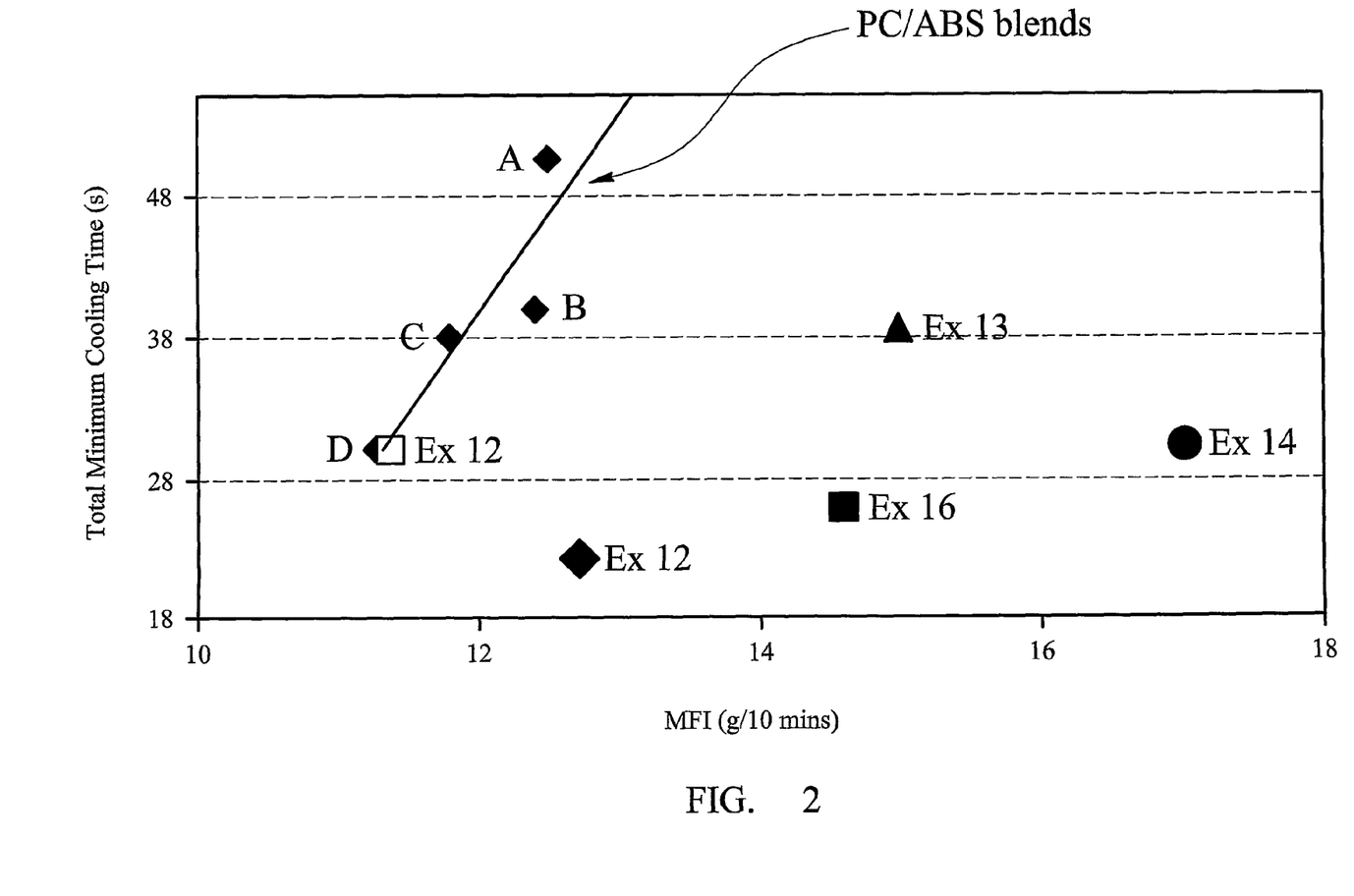
FIG. 2 is a plot of the minimum cooling time of various compositions in an injection moulding application versus the melt flow rate of a composition.

As can be seen from Table 3, typically increasing the Melt Flow Rate of a polycarbonate and ABS blend results in an increase in the minimum total cooling time for producing an article by an injection moulding procedure (compare Examples A to D). However, the inclusion of the non-crosslinked acrylic polymer in the composition typically permits an increase in the Melt Flow Rate of the polycarbonate and ABS blend and a reduction in the minimum total cooling time (compare MFI values and Minimum total cooling time of Examples 12 to 16 with Examples A to D). The cooling time versus MFI of compositions of the present invention (Examples 12 to 16) and standard polycarbonate/ABS blends (Examples A to D) is depicted in FIG. 2.

Advantageously, the compositions of the present invention may be used to form more intricate shaped articles and articles having less residual stress due to the improved Melt Flow Rate. Additionally, due to a reduction in the minimum total cooling time compared with standard polycarbonate/ABS blends the composition of the present invention offer reductions in the process cycle time of an injection moulding procedure.

Examples 17 and 18—Fibre Reinforced Materials

The compositions of Examples 17 and 18 as detailed in Table 4 were prepared in accordance with the "General procedure for preparing a composition comprising an aromatic polycarbonate, a graft copolymer including acrylonitrile, an acrylic polymer and an impact modifier" as detailed herein except a glass reinforcement fibre (HP3786 short glass fibre from PPG) was compounded with the polymer mixture. Comparative compositions G and H were prepared in a similar manner.

As is evident from the properties of the compositions detailed in Table 4, the compositions of the present invention including a reinforcement fibre exhibit enhanced Melt Flow Rates compared to comparable compositions not including a reinforcement fibre, whilst still maintaining satisfactory impact resistance and comparable Vicat B softening temperatures (compare Example 17 with Comparative G and Example 18 with Comparative H).

TABLE 4

| | % by weight | | | | | | Notched | |
|---|---|---|---|---|---|---|---|---|
| Example | Lexan 103 (PC) | Polylac PA 709 (ABS) | Acrylic Polymer | KM355 | Glass Fibre | MFI@260° C. g/10 min | Izod 23° C. kJ/m² | Vicat B ° C. |
| 17 | 58.5 | 13.5 | (Example 4) 13.5 | 4.5 | 10 | 21.8 | 7.0 | 127 |
| Comparative G | 58.5 | 31.5 | — | — | 10 | 12.4 | 9.5 | 131 |
| 18 | 52 | 12 | (Example 4) 12 | 4 | 20 | 18.5 | 5.4 | 130 |
| Comparative H | 52 | 28 | — | — | 20 | 10.9 | 8.3 | 133 |

The invention claimed is:

1. A composition formed from a first mixture of components comprising:
   (i) a first amount of an aromatic polycarbonate;
   (ii) a second amount of a graft copolymer including polyacrylonitrile; and,
   (iii) 3 to 25 wt % of a non-crosslinked acrylic polymer obtained by polymerising monomers consisting of 60 to 100% by weight methyl methacrylate monomer and 0 to 40% by weight of one or more alkyl (alk)acrylate comonomers, and having a weight average molecular weight (Mw) of between greater than or equal to 30,000 Daltons (Da) and less than 50,000 Daltons (Da).

2. A composition as claimed in claim 1 wherein the non-crosslinked acrylic polymer has a weight average molecular weight (Mw) of 30,000 Da to 45,000 Da.

3. A composition as claimed in claim 1, wherein the non-crosslinked acrylic polymer comprises an acrylic copolymer obtained by polymerising 60 to 99.9% by weight of methyl methacrylate monomer and 0.1 to 40% by weight of one or more alkyl (alk)acrylate comonomers.

4. A composition as claimed in claim 3 wherein the acrylic copolymer is obtained by polymerising 80 to 99% by weight of methyl methacrylate monomer and 20 to 1% by weight of one or more alkyl (alk)acrylate comonomers.

5. A composition as claimed in claim 3, wherein the alkyl (alk)acrylate comonomer of the acrylic copolymer comprises an alkyl acrylate comonomer.

6. A composition as claimed in claim 5 wherein the one or more alkyl acrylate comonomers of the acrylic copolymer comprises one or more $C_1$ to $C_8$ alkyl acrylate comonomers.

7. A composition as claimed in claim 6 wherein the one or more $C_1$ to $C_8$ alkyl acrylate comonomers are selected from the group consisting of methyl acrylate, ethyl acrylate, propyl acrylate, butyl acrylate and mixtures thereof.

8. A composition as claimed in claim 3, wherein the acrylic copolymer is obtained by polymerizing 90 to 99% by weight of methylmethacrylate monomer and 10 to 1% by weight of one or more alkyl (alk)acrylate comonomers.

9. A composition as claimed in claim 5, wherein the acrylic copolymer includes only one alkyl acrylate comonomer.

10. A composition as claimed in claim 1, wherein the non-crosslinked acrylic polymer is present in an amount of less than or equal to 20% by weight, based on the total weight of the composition.

11. A composition as claimed in claim 1, wherein the graft copolymer including polyacrylonitrile comprises an acrylic-styrene-acrylonitrile (ASA) polymer, acrylonitrile-EPDM-styrene (AES) polymer, olefin-styrene-acrylonitrile (OSA) polymer or acrylonitrile-butadiene-styrene (ABS) polymer.

12. A composition as claimed in claim 11 wherein the graft copolymer including polyacrylonitrile comprises an ASA polymer, an AES polymer or an ABS polymer.

13. A composition as claimed in claim 1, wherein the graft copolymer including polyacrylonitrile is present in an amount of greater than or equal to 0.5% by weight, based on the total weight of the composition.

14. A composition as claimed in claim 1, wherein the graft copolymer including polyacrylonitrile is present in an amount of less than or equal to 60% by weight, based on the total weight of the composition.

15. A composition as claimed in claim 1, wherein the aromatic polycarbonate is derived from a bis-phenol.

16. A composition as claimed in claim 1, wherein the aromatic polycarbonate is present in an amount of greater than or equal to 30% by weight, based on the total weight of the composition.

17. A composition as claimed in claim 1, wherein the aromatic polycarbonate is present in an amount of less than or equal to 90% by weight, based on the total weight of the composition.

18. A composition as claimed in claim 1, wherein the ratio by weight of the aromatic polycarbonate to the weight of the graft copolymer including polyacrylonitrile is 90:1 to 0.5:1.

19. A composition as claimed in claim 1, further including an impact modifier.

20. A composition as claimed in claim 19 wherein the impact modifier comprises an acrylic based impact modifier or a methacrylate-butadiene-styrene (MBS) based impact modifier.

21. A composition as claimed in claim 19, wherein the impact modifier is in the form of core-shell polymeric particles.

22. A composition as claimed in claim 19, wherein the impact modifier is present in an amount greater than or equal to 1% by weight, based on the total weight of the composition.

23. A composition as claimed in claim 19, wherein the impact modifier is present in an amount of less than or equal to 20% by weight, based on the total weight of the composition.

24. A composition as claimed in claim 1, wherein the Melt Flow Index of the composition at 260° C. applying a 5 kg/cm$^3$ load as determined in accordance with ISO 1133: 1997 is at least 5% greater than a comparable composition containing an equivalent level of aromatic polycarbonate and not including the non-crosslinked acrylic polymer.

25. A composition as claimed in claim 1, for use in melt-processing applications.

26. A composition as claimed in claim 1, further including a reinforcement fibre.

27. A process for manufacturing a composition as defined in claim 1 comprising mixing the aromatic polycarbonate, the graft copolymer including polyacrylonitrile, and the non-crosslinked acrylic polymer.

28. A process as claimed in claim 27 wherein the mixing comprises melt blending the aromatic polycarbonate, the graft copolymer including polyacrylonitrile, and the non-crosslinked acrylic polymer.

29. A process as claimed in claim 27, further including the step of adding an impact modifier.

30. An article comprising a composition as defined in claim 1.

31. A method of manufacturing an article comprising adding a composition as defined in claim 1 in molten form to a mold, allowing the molten composition to solidify in the mold to form the article and removing the article from the mold.

32. A method of forming an article comprising injection molding a composition as defined in claim 1.

33. A method of forming the composition of claim 1, comprising mixing the non-crosslinked acrylic polymer with a component mixture comprising the aromatic polycarbonate and the graft copolymer including polyacrylonitrile and optionally including an impact modifier and/or a reinforcement fibre, whereby the melt flow rate of the component mixture is increased compared to the component mixture not containing the non-crosslinked acrylic polymer.

34. A method of forming an article by injection molding, comprising mixing a non-crosslinked acrylic polymer having a weight average molecular weight (Mw) of between greater than or equal to 30,000 Daltons (Da) and less than 50,000 Daltons (Da) with a component mixture comprising an aromatic polycarbonate and a graft copolymer including polyacrylonitrile and optionally including an impact modifier and/or a reinforcement fibre, and forming an article from a resultant mixture by an injection molding procedure, whereby the process cycle time for forming the article is decreased compared to the component mixture not containing the non-crosslinked acrylic polymer, wherein the non-crosslinked acrylic polymer is in the amount of 3 to 25 wt % and obtained by polymerising monomers consisting of 60 to 100% by weight methyl methacrylate monomer and 0 to 40% by weight of one or more alkyl (alk)acrylate comonomers.

35. A composition as claimed in claim 8, wherein the acrylic copolymer consists essentially of methyl methacrylate monomer and one or more alkyl acrylate comonomers.

36. A composition as claimed in claim 19, wherein the impact modifier comprises a MBS based impact modifier.

37. A composition as claimed in claim 4, wherein the alkyl (alk)acrylate comonomer of the acrylic copolymer comprises an alkyl acrylate comonomer.

38. A composition as claimed in claim 8, wherein the alkyl (alk)acrylate comonomer of the acrylic copolymer comprises an alkyl acrylate comonomer.

39. A composition as claimed in claim 20, wherein the impact modifier is in the form of core-shell polymeric particles.

40. A composition as claimed in claim 36, wherein the impact modifier is in the form of core-shell polymeric particles.

41. A process as claimed in claim 28, further including the step of adding an impact modifier.

42. A composition as claimed in claim 1, wherein the aromatic polycarbonate is derived from 2,2-bis-(4-hydroxyphenyl)-propane (bisphenol A).

* * * * *